United States Patent [19]

Cappelli

[11] 4,381,450

[45] Apr. 26, 1983

[54] PULSED RADIATION DOSIMETRY APPARATUS

[75] Inventor: John R. Cappelli, North Reading, Mass.

[73] Assignee: The United States of America as represented by the Secretary of the Air Force, Washington, D.C.

[21] Appl. No.: 227,558

[22] Filed: Jan. 22, 1981

[51] Int. Cl.³ .............................................. G01T 1/22
[52] U.S. Cl. ................................................... 250/370
[58] Field of Search ...................... 250/336, 370, 371; 307/353; 328/151

[56] References Cited

U.S. PATENT DOCUMENTS 4,087,692  5/1978  Lecuyer et al. ..................... 250/370

Primary Examiner—Alfred E. Smith
Assistant Examiner—Janice A. Howell
Attorney, Agent, or Firm—Donald J. Singer; William Stephanishen

[57] ABSTRACT

A pulsed radiation dosimetry apparatus utilizing a pin diode to detect pulsed radiation that may be produced by either a particle accelerator or a flash x-ray device. The detected radiation signal is integrated and then directly displayed on a digital meter. The present apparatus provides a direct readout of radiation dose in rads.

7 Claims, 3 Drawing Figures

ND DOSIMETRY APPARATUS

PULSED RADIATION DOSIMETRY APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to radiation measuring systems, and in particular to a pulsed radiation dosimetry apparatus.

A particle detector is a device which is used to detect and measure radiation characteristically emitted in nuclear processes. Its radiation types include or x-rays, lightweight charged particles (electrons or positrons), nuclear constituents (neutrons, protons, and heavier ions), and sub-nuclear constituents such as mesons. The particle detector is also known as a radiation detector. Since human senses do not respond to these types of radiation, detectors are essential tools for the discovery of radioactive minerals, for all studies of the structure of matter at the atomic, nuclear, and sub-nuclear levels and for protection from the effects of radiation. They have also become important practical tools in the analysis of materials using the techniques of neutron activation and x-ray fluoresence analysis.

A convenient way to classify radiation detectors is according to their mode of use. For detailed observation of individual photons or particles, a pulse detector is used to convert each such event (that is, photon or particle) into an electrical signal. To measure the average rate of events, a mean current detector, such as an ion chamber, is often used. Radiation monitoring and neutron flux measurements to reactors generally fall in this category. Sometimes, when the total number of events in a known time is to be determined, an integrating version of this detector is used. Position-sensitive detectors are used to provide information on the location of particles or photons in the plane of the detector. Track-imaging detectors image the whole three-dimensional structure of a particle's track. The output may be recorded by immediate electrical readout or by photographing tracks as in the bubble chamber. The time when a particle passes through a detector or photon interacts in it is measured by a timing detector. Such information is used to determine the velocity of particles and when observing the time relationship between events in more than one detector. The present invention provides a pulsed radiation dosimetry apparatus for measuring pulsed radiation particles.

SUMMARY OF THE INVENTION

The present invention utilizes a solid state radiation detector, such as a pin diode, to measure a pulsed radiation signal that is generated by a device such as a particular accelerator. The detected radiation signal is integrated in an integration circuit to determine the total energy therein which is displayed on a digital panel meter in real time. The apparatus may be operated in either the multiple pulse or single pulse mode. The multiple pulse mode would be useful in monitoring or tuning a linear accelerator. In the single pulse mode the system will automatically display total dose of a transient event in real time and hold that measurement indefinitely or until the next measurement is made. The direct readout of the total radiation due is in rads.

It is one object of the present invention, therefore, to provide an improved pulsed radiation dosimetry apparatus.

It is another object of the invention to provide an improved pulsed radiation dosimetry apparatus with a system pulse width response of 0.02 to 5.0 $\mu$sec.

It is another object of the invention to provide an improved pulsed radiation dosimetry apparatus that measures and displays the radiation dose of a transient event in real time.

It is still another object of the invention to provide an improved pulsed radiation dosimetry apparatus that can operate in a repetitive pulse mode which continually displaying radiation amounting up to a rate of 180 pulse/second.

It is yet another object of the invention to provide an improved pulsed radiation dosimetry apparatus that operates in either the single pulse mode or the multiple pulse mode.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
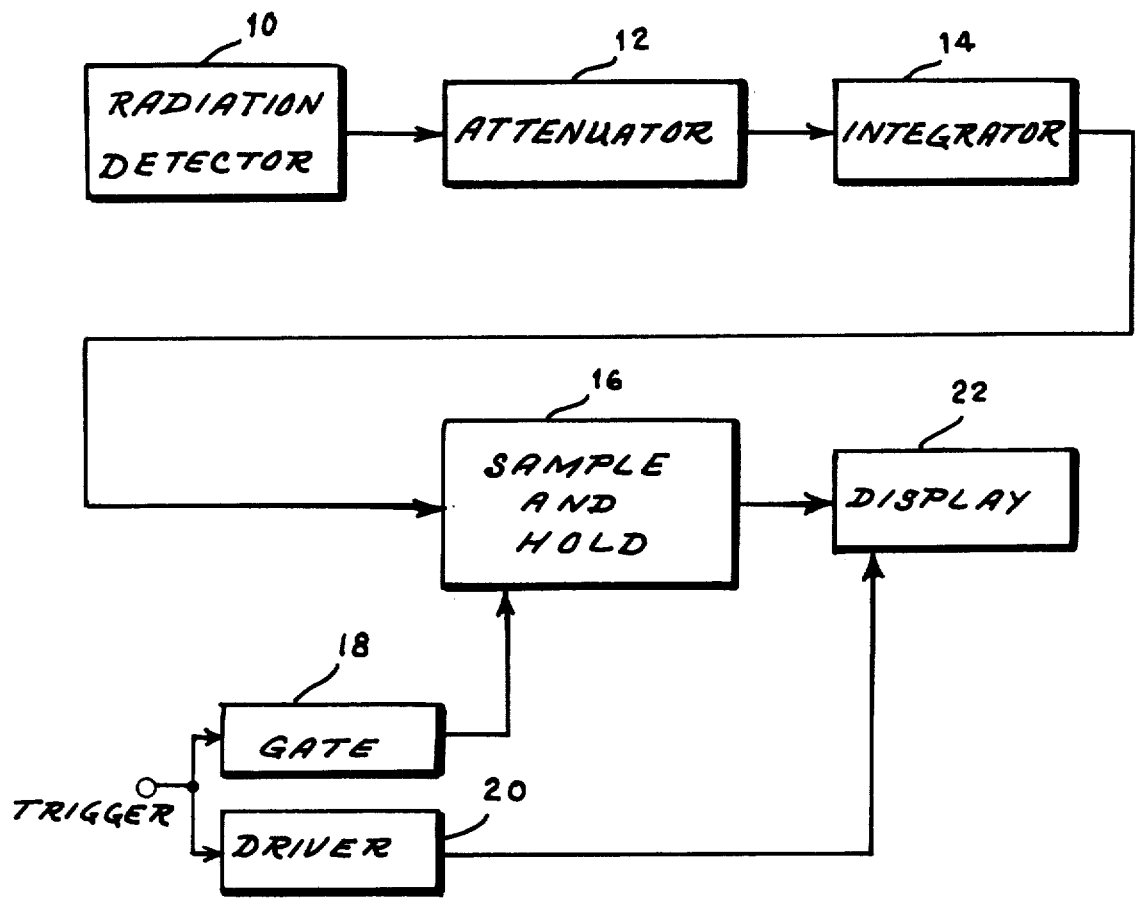
FIG. 1 is a block diagram of the pulsed radiation dosimetry apparatus according to the present invention.

Referring now to FIG. 1, there is shown a pulsed radiation dosimetry apparatus utilizing a radiation detector 10 to detect a pulsed radiation signal. The pulsed radiation signal may be the type that is typically produced by a particle accelerator as a flash x-ray machine or the like. The radiation detector 10 detects the radiation signal energy and provides a voltage signal that is proportional representative to the energy therein. An attenuator unit 12 is connected to the radiation detector 10 to receive the voltage signal therefrom. The attenuator unit 12 provides the means to keep the voltage signal to the integrator unit 14 at or below an established input threshold level.

The integrator unit 14 receives the voltage signal from the attenuator unit 12 and integrates the voltage waveform to provide an output signal that is equivalent to the total radiation energy of the applied pulsed radiation signal. A sample and hold unit 16 is connected to the integrator unit 14 to receive the output signal therefrom and to hold this signal for a predetermined length of time. The sample and hold unit 16 is activated by a gate unit 18 that receives an external trigger signal. The trigger signal may be generated externally by the device that provides or controls the generation of the pulsed radiation signal. However, it should also be well understood that the trigger signal may also be generated internally to the present apparatus in any of several known conventional ways.

The display unit 22 receives the output signal from the sample and hold unit 16 and displays this output signal in a digital or any other convenient conventional readout means. The display unit 22 is capable of operating in either a single pulse mode or a multiple pulse mode. When the present apparatus is operated in the single pulse mode, the display unit 12 receives a drive signal from the driver unit 20 which is activated by the trigger signal. In the single pulse mode, the drive signal to the display unit 22 enables it to hold the displayed radiation reading for an indefinite time.

Figure 2:
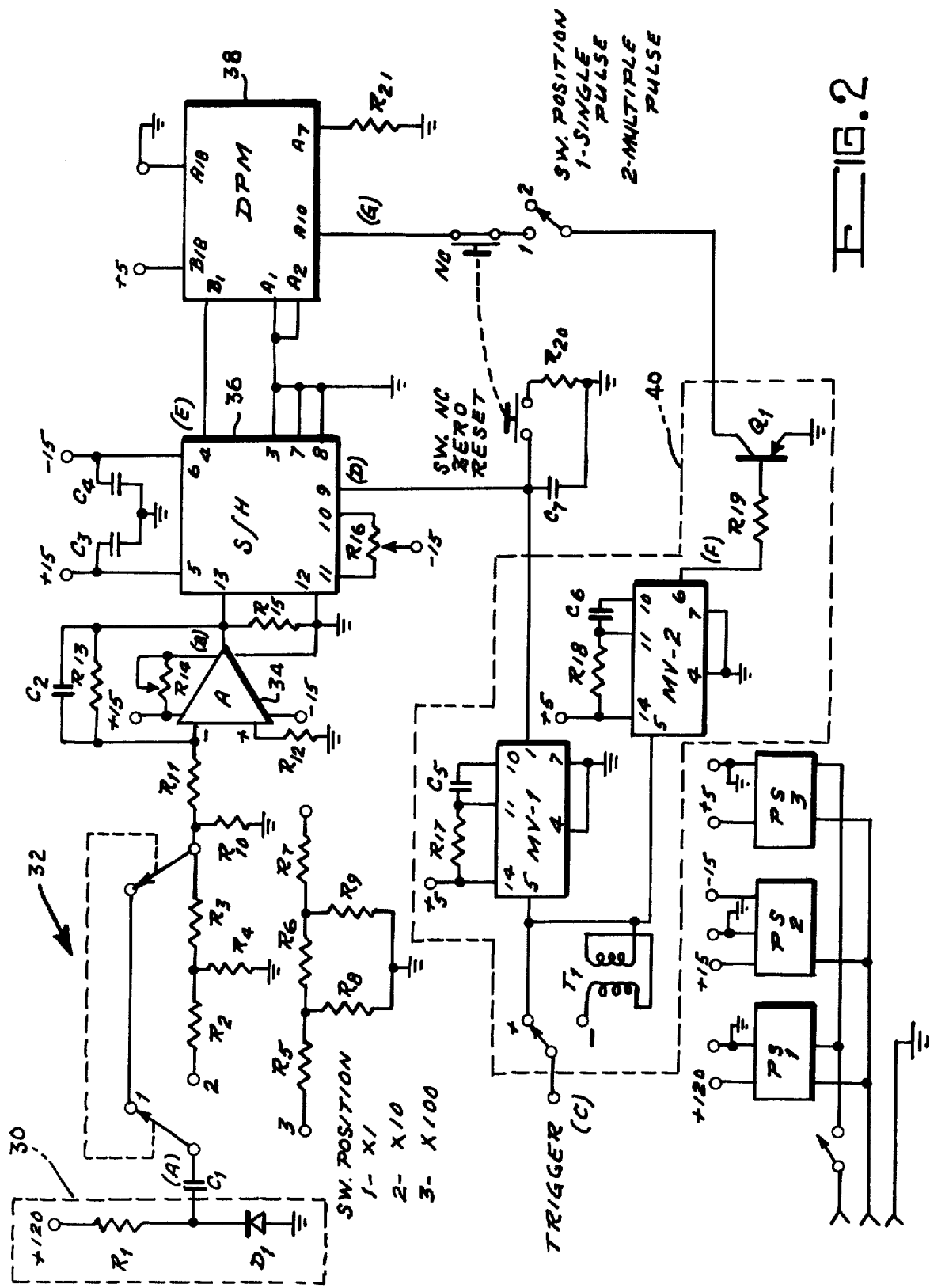
FIG. 2 is a schematic diagram of the pulsed radiation dosimetry apparatus, and, FIG. 3 is a graphical representation of signal waveforms within the pulse radiation dosimetry apparatus as shown in FIG. 2.

Turning now to FIG. 2, there is shown a schematic diagram of pulsed radiation dosimetry apparatus utilizing a detector unit 30 to detect a radiation pulse. The detector unit 30 comprises a diode D1 and a resistor R1 which are connected in series between +120 volts and ground. The diode D1 may be any type of radiation sensitive solid state device, such as for example, a pin diode.

Pin diodes behave much like ionization chambers when used as radiation detectors. The output response of the pin diode detector is proportional to the energy that is deposited in the depletion region. The current which is generated in the depletion region by incident radiation is measured by sampling the voltage across a load resistor.

In the present example, a Unitrode Pin Diode series UN7200 was used as the radiation detector. A female BNC cable connector such as FXR No. 68150, was modified to mount protect the pin diode during use. The diode mount is constructed so that it will closely approximate the surface dose rate of electrons and x-rays. With a wall thickness of 0.25 mm for the mount and half the thickness of the diode, 1.14 mm, a total thickness of 1.39 mm is achieved. This provides the minimum amount of material practical for the pin diode package and is a reasonable approximation of surface dose.

The composition of the pin diode lends itself nicely as a radiation detector. Since the diode is silicon and its mount aluminum, the radiation dose may be expressed in rads (Si). In the field of radiation testing and the evaluation of components and system, a direct measurement of dose in rads (Si) is convenient since silicon is used extensively today in the manufacture of semiconductors. The small size of the diode is useful in locating it near a sample under test thereby minimizing geometry corrections. In particle beam uniformity applications, resolution in the order of 3.5 mm may be obtained.

The output signal from the detector unit 30 is applied to an attenuator unit 32. The maximum output signal of the pin diode is in the order of 50-60 volts and therefore attenuation is necessary to prevent overloading the input of the integrator unit 34. Signal attenuation is provided by a manually operated three position range switch which provides three ranges of attenuation. In position one, the full output of pin diode is applied to the integrator input when the radiation signal is in the range of 1 to 199 rads. In position two, the pin diode signal is attenuated by 20 db by using a single T section resistive attenuator. The useful range of the system in position two is 10 to 1999 rads and requires multiplying the display by 10. In position three, a dual T section resistive attenuator is used to reduce the pin signal 40 db which results in a radiation signal range of 100 to 1999 rads. This requires multiplying the display by 100. An overflow display on the digital panel meter 38 indicates when range changing is necessary.

An integrator unit 34 which receives the output signal from the attenuator unit 32 is utilized to determine the radiation energy in the detected radiation pulse. One of the techniques that may be used to measure radiation pulse total dose is to record the pulse profile using a pin diode or other radiation sensitive device with an oscilloscope and camera. The recorded pulse width and amplitude of the waveform is then measured and applied to a conversion factor to obtain dose rate or total-dose. However, because of the irregularity in the pulse shape of particle accelerate beams, much difficulty is encountered in interpreting the results.

The pulsed radiation dosimetry apparatus overcomes this problem by electronically integrating the output of a pin diode. The integrator unit 34 in the present example is a Datel model AM-103 wide-band operational amplifier. The op-amp is an inverting analog pulse integrator with capacitive feedback and DC stabilization. The integrator output voltage is proportional to the time integral of the pin diode signal times a constant, which may be given by:

$$E_O = -1/RC \int E_{in} dt$$

The circuit values are determined by the pin diode calibration factor, the time constant of the integrator and the voltage range of the digital display unit. The following calculations will provide typical circuit values for these units in the present example:

(1) the Integrator Unit $$E_O = 1/RC \int e_{in} dt$$

where
$E_O$ = integrator output voltage
R = value of input resistor, R11
C = value of feedback capacitor, C2
$E_{in}$ = integrator input voltage
d+ = radiation pulse width (2) the Pin Diode $$\text{Calibration factor} = 6.7 \times 10^7 \text{ rads·sec}^{-1}\text{·volt}^{-1}$$

where
sec = dt
volts = $E_{in}$ (3) the Digital Display (DPM)

Full scale input range-1.99 volts = $E_O$ and
$E_O$ = rads × multiplier

Therefore
RC = $E_{in}$ dt/$E_O$
RC = 60 × 0.01 × 5 × 10$^{-6}$/199.9 × 100
RC = 1.59 × 10$^{-5}$
where
$E_{in}$ = 60 v = 0.1 (max attenuation)
dt = max pulse width
$E_O$ = 199.9 × 100 (multiplier)

Thus any value of R and C that yields 1.5 × 10$^{-6}$ may be used, however, the current and loading limitations placed on R restricts its value to between the range 2KΩ and 5LΩ

Therefore, if a value for the resistor is closer such that R = 3.3kΩ, then C = 1.5 × 10$^{-6}$/330 or C = 450 pf.

This value of capacitance is reasonable since making C too large would cause a nonlinearity in the ramp voltage. It is necessary that a resistor R12 equal in value to R be placed at the noninverting input to ground in order to minimize the error which may result from the bias current. A potentiometer R16 is used to adjust the offset voltage to zero with no applied signal.

In order to be able to read the integrated output of the pin diode, it is necessary for the integrator to hold its output value for a time of a few seconds which would be enough time for a visual observation. Unfortunately, the decay time is much too rapid to obtain a reading without further processing. The decay time is approximately 3 mv/$\mu$s for the values given to the integrator units. Therefore, a sample and hold unit 36 is required to hold the output from the integrator unit for a predetermined length of time. In the present example, a Datel model SHM-4 module is used to sample the output of the integrator and to hold this value long enough for the digital panel meter 38 to respond. This requires a decay time several orders of magnitude longer than the integrator. The sample and hold output dump in the hold mode is less than 20 $\mu$v/ms. The sample and hold unit 36 is used in the noninverting mode with no gain.

Figure 3:
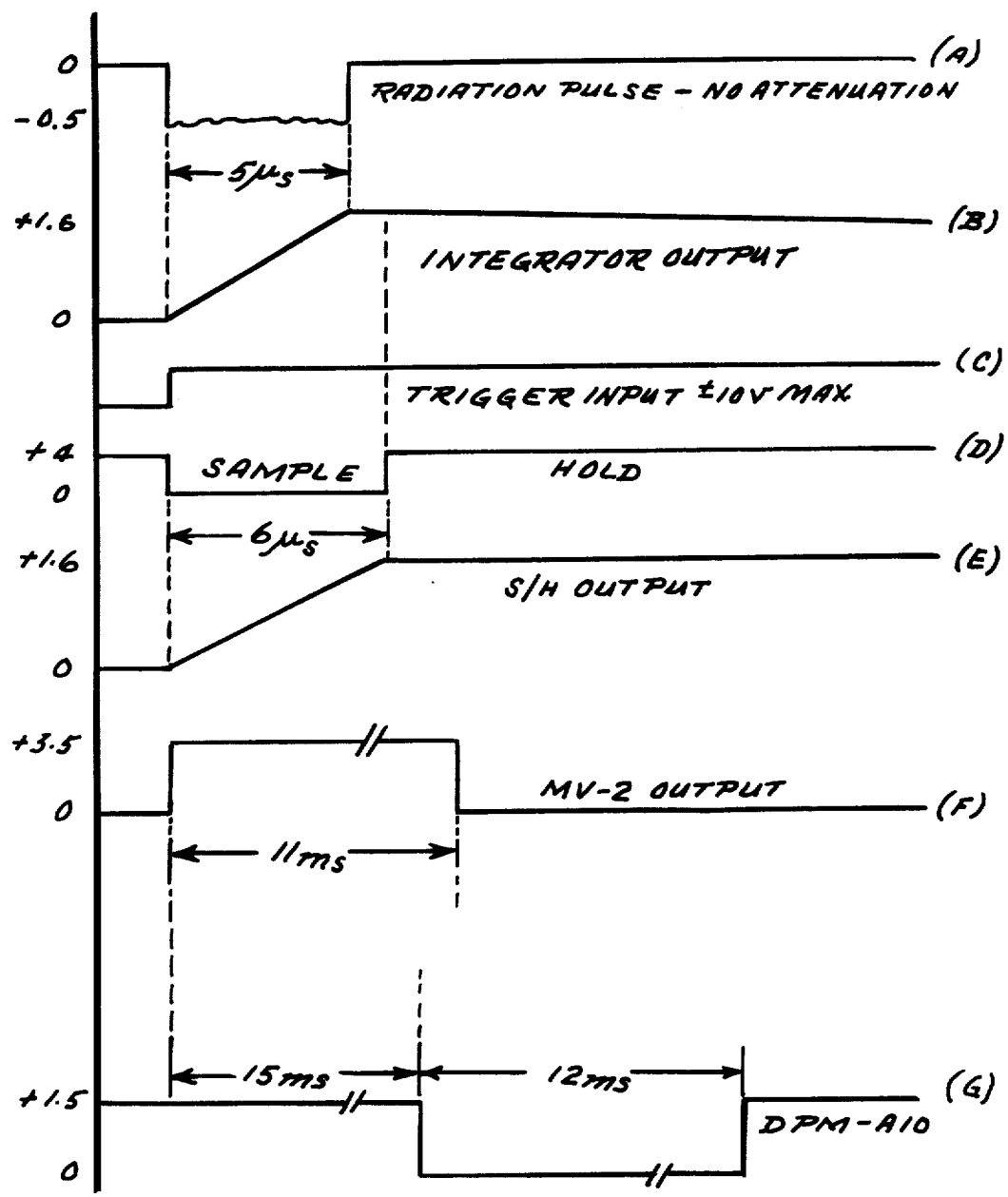

The signal output from the integrator unit 34 is applied to the input of the sample-hold unit 36. Simultaneously, a gate pulse (D) is applied to the digital input of the sample and hold unit 36 to sample the input pulse (B). In FIG. 3, there is shown (not to scale in time) the circuit waveforms A-G which are utilized and also shown at the appropriate points in FIG. 2. With no gate pulse present, the sample-hold output will hold the value samples at 6 $\mu$sec for a time determined by the output droop. The system is automatically reset whether in the single or multiple pulse mode by the action of gate pulse (D). Since the integrator output has returned to zero volts before the next input pulse arrives, the gate pulse (D) starts the sampling sequence at the integrator zero level. A manual reset switch may be utilized to check the zero level during multiple pulse operation. With no signal at the input or the input grounded, sample offset and hold offset voltage is adjusted to zero volts.

The gate and driver unit 40 which receives the trigger signal (C), comprises a first and second multivibrator MV-1, MV-2, and a drive transistor Q1. The timing signals for the pulsed radiation dosimetry apparatus are provided by the two monostable multivibrators MV-1, MV-2 both of which may be triggered by either a positive or negative going trigger waveform. One of the multivibrators MV-1 gates the sample-hold unit 36. The second multivibrator MV-2 provides a gate pulse (G) through the driver transistor Q1 to digital panel meter 38 to operate the read and hold function. The pulse width for both multivibrators MV-1, MV-2 is determined by the relationship $$t_w = RC\, e_n 2$$

where
R = value of external resistor in ohms
C = value of external capacitor in farads
A pulse width of 6 $\mu$sec with an amplitude of $-4$ volts is used as the gate for the sample command since the widest radiation pulse to be detected is 5 $\mu$sec. This permits the sampling of the integrator output at its peak value. The width of the gate pulse for the driver transistor Q1 is set at 11 m sec with an amplitude of 3.5 volts. A dc level of +4 volts is needed for the hold command.

The digital panel meter 38 which is a Datel model DM-2000 panel meter is used as a readout for the system. The meter has a full scale input range of 1.999 volts and a resolution of one millivolt. When the system is utilized to the single pulse mode, the meter 38 will automatically read and hold its last display. This is accomplished by the driver Q1 momentarily removing pin A-10 of the panel meter 38 from ground during a radiation pulse. In the multiple pulse mode, the meter 38 will sample and display at a rate of 120 samples per second. An overflow indication will occur when the input voltage to the meter exceeds full scale, then all the digits are blanked and the characters "OF" are displayed. The overflow display requires that the attenuator range be changed to obtain a display reading.

The meter 38 may also provide decimal point selection by grounding the appropriate pin on the connector. In the present example, the pin A-7 is grounded to place the decimal before the least significant digit. With the decimal point in this position, the meter reading times the attenuator setting, will read directly in rads.

Although the invention has been described with reference to a particular embodiment, it will be understood to those skilled in the art that the invention is capable of a variety of alternative environments within the spirit and scope of the appended claims.

What is claimed is:

1. A pulsed radiation dosimetry apparatus comprising in combination:
   a radiation detector means to receive a pulsed radiation signal, said radiation detecting means providing a voltage signal in response to said pulsed radiation signal,
   an attenuator means receiving said voltage signal from said radiation detector means, said attenuator means providing more than one level of attenuation,
   an integrator means receiving said voltage signal from said attenuator means, said integrator means integrating said voltage signal and providing a ramp signal in response thereto,
   a sample and hold means receiving said ramp signal from said integrator means, said sample and hold means sampling and holding said ramp signal for a predetermined length of time, said sample and hold means providing a dose rate signal,
   a gate driver means receiving a trigger signal, said trigger signal being coincident with the test of said pulsed radiation signal, said gate driver means providing a first and second control signal, said first control signal enabling said sample and hold means to sample and hold said ramp signal, and,
   a display means receiving said dose rate signal from said sample and hold means, said display means receiving said second control signal from said gate driver means, said second control signal enabling said display means to continuously display said dose rate signal.

2. A pulsed radiation dosimetry apparatus as described in claim 1 further including a switch means to provide either single or multiple pulse operation, said switch means being connected between said gate driver means and said display means.

3. A pulsed radiation dosimetry apparatus as described in claim 1 wherein said radiation detector means comprises in combination:
   a pin diode to receive said pulse radiation signal, and,
   a resistor in series with said pin diode between a positive voltage supply and ground, said resistor having a predetermined voltage across it, said voltage across said resistor changing in response to said pulse radiation signal which is received by said pin diode.

4. A pulsed radiation dosimetry apparatus as described in claim 1 wherein said integrator means comprises an operational differential amplifier which is arranged in an integrating configuration.

5. A pulsed radiation dosimetry apparatus as described in claim 1 wherein said gate driver means comprises a first and second multivibrator, said first multivibrator generating said first control signal and said second multivibrator generating said second control signal.

6. A pulsed radiation dosimetry apparatus as described in claim 1 wherein said sample and hold means proides a sampling time of at least six microseconds.

7. A pulsed radiation dosimetry apparatus as described in claim 1 wherein said predetermined length of time may be varied from six microseconds to infinity.

* * * * *